Feb. 6, 1973   W. D. GRUPP   3,715,155
AUDIO VISUAL DISPLAY DEVICE
Filed Aug. 30, 1968   4 Sheets-Sheet 1

INVENTOR.
Walter Daniel Grupp
BY
Sheridan and Ross
ATTORNEYS

INVENTOR.
Walter Daniel Grupp
BY Sheridan and Ross
ATTORNEYS

Feb. 6, 1973 W. D. GRUPP 3,715,155
AUDIO VISUAL DISPLAY DEVICE
Filed Aug. 30, 1968 4 Sheets-Sheet 3

INVENTOR.
Walter Daniel Grupp
BY Sheridan and Ross
ATTORNEYS

Feb. 6, 1973 W. D. GRUPP 3,715,155
AUDIO VISUAL DISPLAY DEVICE
Filed Aug. 30, 1968 4 Sheets-Sheet 4

INVENTOR.
Walter Daniel Grupp
BY Sheridan and Ross
ATTORNEYS

United States Patent Office  3,715,155
Patented Feb. 6, 1973

3,715,155
AUDIO-VISUAL DISPLAY DEVICE
Walter Daniel Grupp, Boulder, Colo., assignor to
Elba Corporation, Denver, Colo.
Filed Aug. 30, 1968, Ser. No. 756,609
Int. Cl. G03b 31/00, 3/00, 21/28
U.S. Cl. 353—15         5 Claims

ABSTRACT OF THE DISCLOSURE

A portable audio-visual display device characterized by a compact film cartridge employing conventional 35 mm. still camera film strip, the frames being sequentially power advanced by a signal received from an audio unit and the take-up spool also being synchronously power driven in such manner to compensate for the increase in diameter of the film convolutions on the take-up spool. Manual override of the power drive is provided for framing with a film gate or manual advance of the frames. Power operated film advance features an escapement drive which is initiated by a short duration signal received from the audio unit and a holding circuit which maintains it in operation until the film has been advanced one frame.

BACKGROUND OF THE INVENTION

Portable audio-visual display devices have recently become of increasing importance for use in sales promotions, educational and briefing aids, and entertainment. As distinguished from motion pictures accompanied with sound, these are of the still picture type which retain an image on a projection screen for a time desired for completion of the audio portion which pertains to each picture or other visual type of display. The transparencies to be projected have taken various forms, such as large separate reels of the motion picture type, strips of film retained in moveable carriers, and individual framed slides similarly retained. While these various devices have performed the desired end function of a still picture display, accompanied with audio, they have been unduly bulky, cumbersome to place into operation, principally by reason of the magazine or storage form of the sequential frames to be projected, and unnecessarily expensive due to complicated construction. The present invention provides an advancement in such art through use of a more simplified manner of storage and handling of the film and a more rapid and foolproof manner of applying the film to the device.

DESCRIPTION OF THE PREFERRED EMBODIMENT

Figure 1:
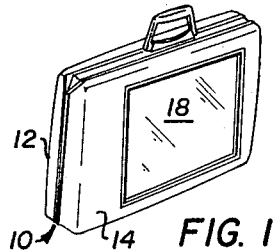
FIG. 1 is a perspective view of a portable case, containing the subject of the invention, in its closed carrying position.
Figure 2:
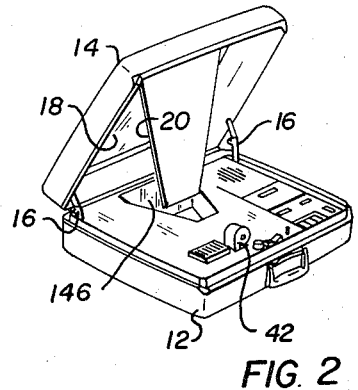
FIG. 2 is a like view in its open operative position, some details being omitted for purposes of simplicity in presentation.
Figure 3:
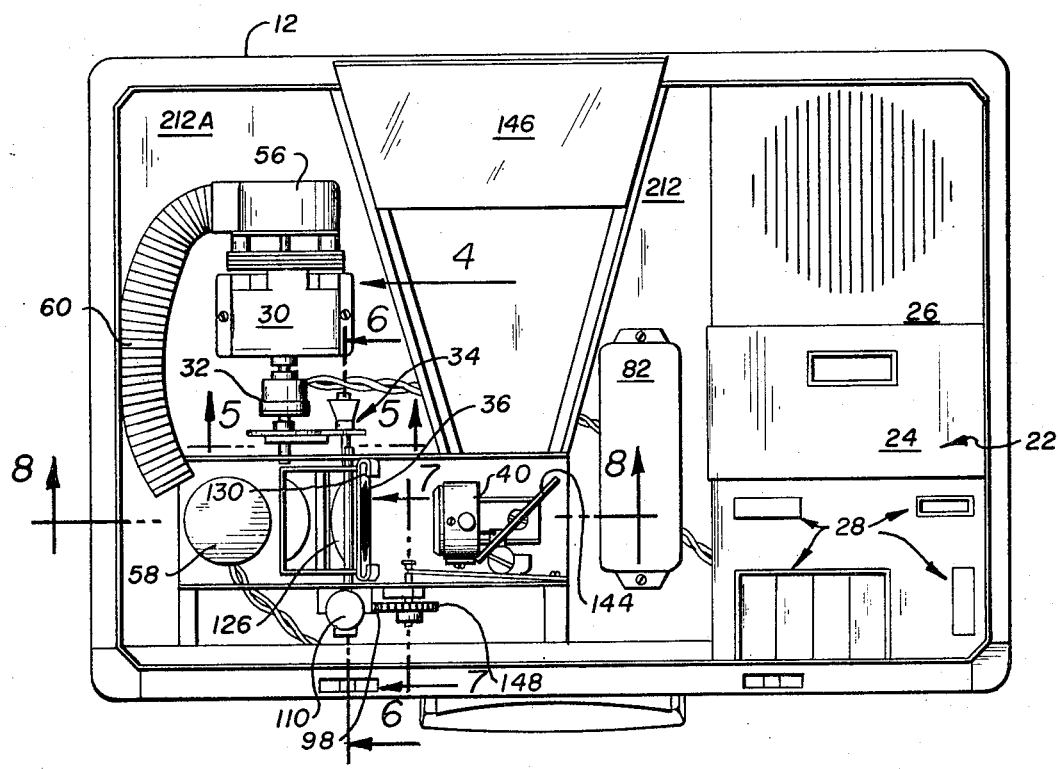
FIG. 3 is a top plan of the lower portion of FIG. 2.

Referring now to the drawings, and first to FIGS. 1 to 3, the operative parts of the invention are housed within an attache type case 10 having a bottom or base 12 and a similar shaped top or lid 14 hinged to said base 12 along one edge which may be locked in elevated position, as shown in FIG. 2, by conventional luggage locks 16. The major area of the lid is formed as a translucent screen 18 which may be of plastic material and suitably treated on its inside surface for projection of a picture or other information thereon. A mirror or reflecting surface 20 is pivoted to the lid at its upper edge which folds into the lid and parallel with the screen when closed, and may be moved to a locked angular position as shown in FIG. 2 during use of the device.

The bottom 12 of the case houses the principal operative parts of the invention which comprise, in general, a conventional audio unit 22 including tape cartridge 24, speaker 26, and controls 28 for selecting the desired operative functions of the unit. The audio unit 22 is preferably removably mounted for use in recording conversations and the like. Additionally, the audio unit 22 may be used to record the conversation following the presentation of the material involved.

The principal features of the invention and which may be employed in environments other than that so far described, comprises an electric motor 30, a clutch 32, an intermittent film frame advance or indexing mechanism 34, a film cartridge holder or carrier 36, lens mount 40, all as generally shown in FIG. 3, and a film cartridge 42 and its contents, as best shown in FIGS. 10 to 15, which is carried by cartridge carrier 36, each of which components will now be described in detail.

Figure 4:
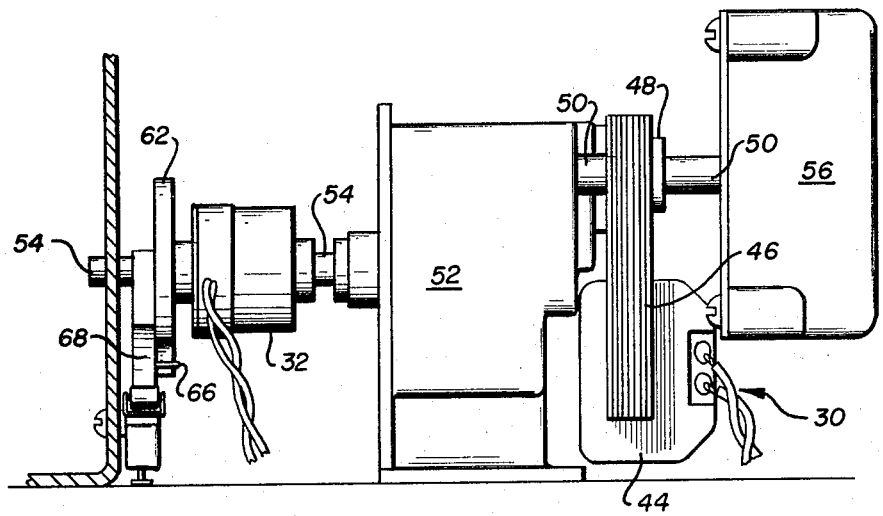
FIG. 4 is a side elevation as viewed in the direction of arrow 4, FIG. 3.

Motor 30, as best shown in FIG. 4, comprises a field coil 44, laminated field 46, an armature 48 rotatable within the poles of the laminated field, the armature being mounted on output shaft 50. One end of shaft 50 is connected to a speed reducer 52, having an output shaft 54, and the other end is connected to a blower 56 which delivers cooling air to projector light source 58 through a flexible conduit 60, as best shown in FIG. 3. Due to the relatively large power requirements for the projector light, which would render the use of batteries difficult within the space available, it is preferred to employ conventional 110 v. A.C. for both the motor and projector light. As will be apparent, however, these devices may be suitably designed and powered by batteries of desired voltage where their space and weight is of no importance or in areas where conventional 110 v. A.C. is unavailable. A convenient speed for output shaft 54 has, however, been found to be of the order of 100 r.p.m. with the design of the more important elements of the invention to now be described.

Shaft 54, which continuously rotates, may be selectively connected to disk 62 of film advance mechanism 34 through clutch 32. This is preferably of the electric type, exemplary of which is one manufactured by the Electroid Corporation of Pittman, N.J. In general, it comprises a stationary torroidal field coil which, when energized, magnetically engages a pair of clutching members and when de-energized releases same from driving connection. One of the clutching members is affixed to shaft 54 and the other to disc 62 so that when the clutch is engaged, disc 62 rotates with shaft 54 but when disengaged shaft 54 continues to rotate within disc 62 for a purpose which will subsequently appear.

Figure 5A:
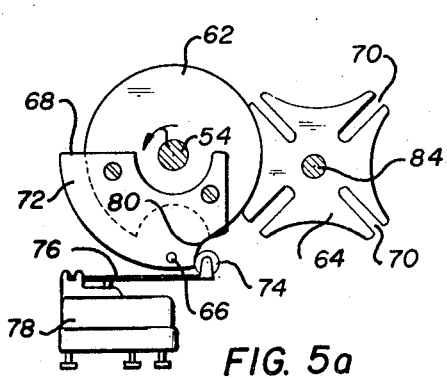
FIG. 5a is a like view showing the parts of FIG. 5 in a different operative position.
Figure 5:
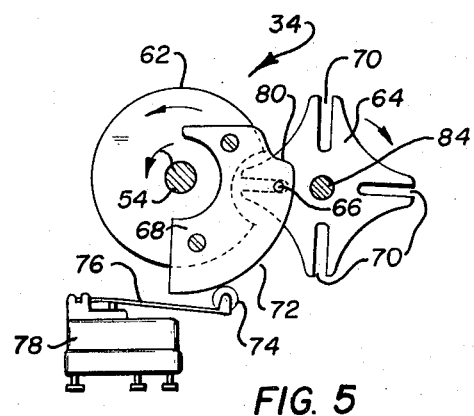
FIG. 5 is a side elevation and section taken on line 5—5, FIG. 3.

Disc 62, as best shown in FIGS. 5 and 5a, which is intermittently and selectively connected to output shaft 54, forms the driving part of a Geneva stop or escapement mechanism, the driven cam or wheel member 64 being intermittently rotated 90° each time pin 66, carried by plate 68, engages a slot 70 in member 64. During the remaining portion of the rotation of disc 62, member 64 is locked against rotation due to the engagement of the convex circular periphery of the disc with a concave circular surface of member 64 formed between the slots. Such mechanisms are well known. While coaction of pin 66 and slots 70, together with the locking period between their coaction, is conventional, plate 68 performs a control function which departs from the conventional operation of a Geneva mechanism. As best shown in FIG. 5, shaft 54 and disk 62 are now clutched together and pin 66 is rotating escapement wheel 64. Upon continued motion, pin 66 will move out of a slot 70 and circular cam lobe 72 will disengage from roller 74 carried by a spring arm 76 on micro switch 78. When this occurs, the micro switch de-energizes the circuit to the electric clutch which thus disengages the driving connection between shaft 54 and disc 62. The frictional drag between continuously rotating shaft 54 and disc 62, which is now freely journaled on the shaft, causes the disc to continue to rotate until cam ramp 80 abuts roller 74, as shown in FIG. 5a, at which time rotation of disc 62 is arrested since the force required to move roller 74 up ramp 80 against its spring urge exceeds the frictional torque or drag between shaft 54 and disk 62. As will be apparent from FIG. 5a, shaft 54 continues to rotate, disc 62 is now stationary and locks escapement wheel 64 against rotation. The parts are now in position for a command signal to rotate escapement wheel 64 another 90°. This signal is received at a desired time from tape in tape cartridge 24 which produces an inaudible 100 cycle signal which is transmitted to a filter system 82, see FIG. 3, which triggers a relay and energizes the electric clutch. The duration of this signal, however, is only a fraction of a second and only sufficient to engage the clutch for moving roller 74 up ramp 80 at which time micro switch 78 closes a parallel energizing circuit to the clutch and maintains it energized until roller 74 again moves off of lobe 72. As will be apparent, disc 62 continues to rotate by frictional drag and returns to the position shown in FIG. 5a, awaiting the next command signal to rotate and index escapement wheel 64.

Figure 6:
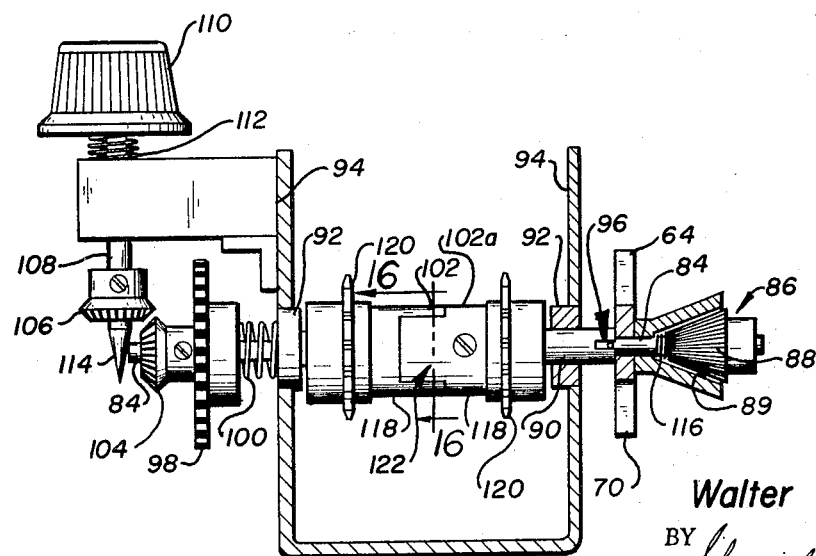
FIG. 6 is a section taken on line 6—6, FIG. 3.
Figure 7:
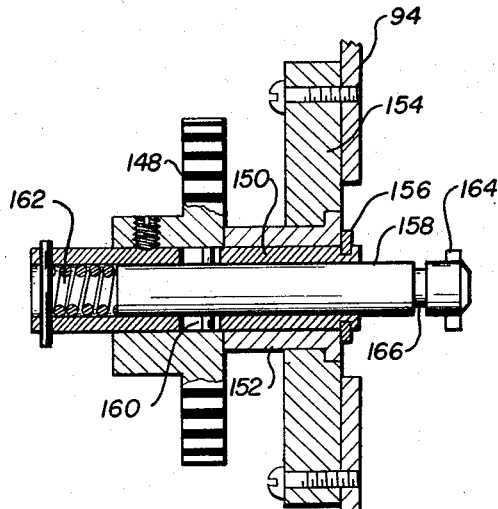
FIG. 7 is a section taken on line 7—7, FIG. 3.

Referring now to FIG. 6, escapement wheel 64 is journaled on a shaft 84 and releasably connected to same by a cone clutch 86 having a cone member 88 affixed to the shaft which engages a corresponding female cone surface 89 forming a part of wheel 64. Shaft 84 is disposed axially within a sleeve 90 supported by a pair of bearings 92 disposed at opposite sides of a U-shaped frame 94. Shaft 84 rotates with sleeve 90 but may be positioned axially of same through a key or splined connection, illustrated as pin and slot connection 96. A spur gear 98 is affixed to the other end of shaft 84 and a compression spring 100 urges shaft 84 to the left, thus engaging cone 88 with surface 89 in which position wheel 64 may rotate sleeve 90 and sprocket member 102, 102a which is affixed to the sleeve. A bevel gear 104 is affixed to shaft 84, adjacent gear 98, which may be engaged by a like bevel gear 106 affixed to an axially moveable shaft 108 having a knob 110 on same and urged upwardly by a compression spring 112. In the position shown in FIG. 6, spring 112 has urged bevel gear 106 to an unmeshed position relative to bevel gear 104 and spring 100 is now maintaining in engagement cone 88 and surface 89 of clutch 86. The lower end 114 of shaft 108 is formed in the shape of a cone and may engage the left end of shaft 84 upon downward movement of knob 110. When this occurs, end 114 cams shaft 84 axially to the right, engaging bevel gears 104, 106 and disengaging clutch 86. Rotation of knob 110 now effects rotation of sprocket member 102, 102a, which is now free to rotate relative to locked escapement wheel 64. The purpose of this is to frame the film in proper registry with a film gate to subsequently be described. After proper framing, knob 110 is released and shaft 84 is again clutched to escapement wheel 64 which will thereafter index or move the film under power one frame at a time in registry with the film gate. Knob 110 may of course be operated at any time to override the power indexing and manually index the film frames.

The members comprising clutch 86 are preferably of the positive engagement type having longitudinally extending teeth on same. With the provision of 80 teeth, framing may be accomplished to an angular relative position between members 88, 64 of 4½° which has been found to yield an acceptable tolerance of registry of the film frames and film gate. A spring 116 is also preferably provided to positively urge the clutch members apart upon axial movement of shaft 84.

Figure 8:
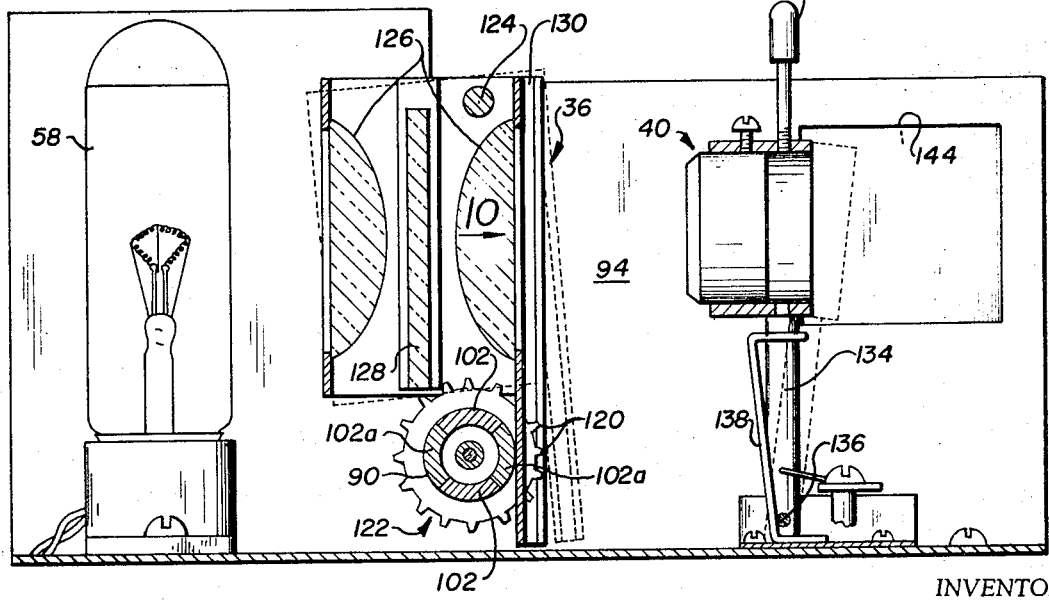
FIG. 8 is a section taken on line 8—8, FIG. 3.
Figure 10:
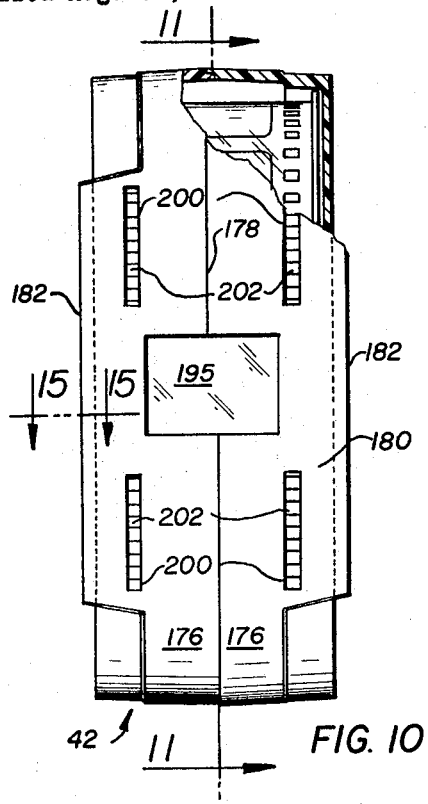
FIG. 10 is a front elevation of a film cartridge, omitted in FIG. 8, but as it would be viewed in the direction of arrow 10 in FIG. 8, a portion being broken away.

Sprocket member 102, 102a is preferably constructed of two identical halves, each having a hub 118 with integral sprocket teeth 120 and a mating tongue and slot connection 122 best shown in FIG. 8. As will be apparent, when the two identical halves are pressed together the tongues of one engage the slots of the other forming a unitary sprocket member which is identical at each side of its central plane. With such construction, the cost of the unitary sprocket member may be reduced by simplification of the moulding dies for manufacturing same.

Still referring to FIGS. 3 and 8, cartridge carrier 36 is connected at its upper end to frame 94 for slight pivotal movement about a pivot pin 124 (as best shown by the full and dotted line position in FIG. 8), limited pivotal movement is necessary to permit insertion and removal of the film cartridge 42 for reasons to subsequently appear. The front and rear walls of the carrier are suitably apertured and support condenser lenses 126, a plane heat shield lens 128 being suitably supported between the condenser lenses, such condenser system being conventional and known in the art. The vertical forward lateral edges of the carrier 36 are so shaped to provide a pair of U-shaped guide channels 130 which slideably receive a pair of flanges or ribs on the film cartridge 42 to be subsequently described. For a better understanding at this point, however, the ribs on the film cartridge are inserted in the U-shaped guide channels and the cartridge pressed downwardly which causes the carrier to pivot to the dotted line position of FIG. 8, as the sprocket teeth 120 ride over the front face of the film cartridge and enter suitable slots therein with the sprocket teeth in engagement with the film driving perforations. When this occurs the carrier 36 has returned to the full line position of FIG. 8.

Figure 9:
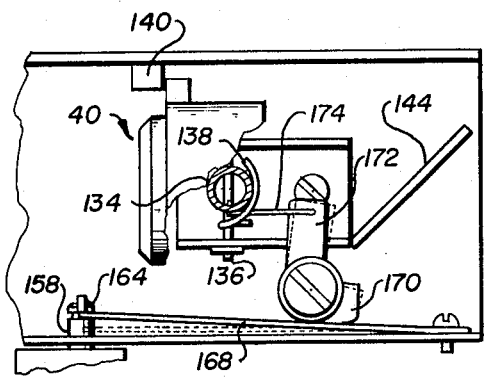
FIG. 9 is a top plan of a portion of FIG. 8, as viewed in the direction of arrow 9.

Referring now to FIGS. 3, 8 and 9, projection lens mount 40, containing suitable lenses (not shown), is supported by a post 134 pivotally secured to frame 94 at its lower end by a pivot pin 136. A spring 138 urges the lens mount 40 to its normal full line position of FIG. 8 and against a stop 140, see FIG. 9. A knob 142 is secured to the lens mount for pivoting it to the dotted position to permit insertion or removal of the film cartridge 42. A flat mirror 144 is also affixed to the lens system, forming the first reflecting surface in the optical path to screen 18. A second mirror 146 (FIGS. 2 and 3) reflects the projected image from mirror 144 to third mirror 20 which reflects same onto screen 18.

The pivotal movement of the lens system not only permits insertion and removal of the film cartridge 42, as previously referred to, but is also utilized to disengage connection of the power drive to the take-up spool in the film cartridge which will now be described.

Referring now to FIGS. 3, 6, 7 and 9, gear 98, previously referred to, meshes with a gear 148 (FIGS. 3 and 7) affixed to a sleeve 150, supported for rotation in a bushing 152 (FIG. 7) carried by mounting plate 154 affixed to frame 94. The gear 148 is restrained against axial movement in the bushing 152 by its abutment with same and by a snap ring 156. A shaft 158 is drivingly connected to the sleeve 150 by a pin and slot connection 160 which permits the shaft 158 to move axially under the bias influence of a spring 162. The free end of the shaft 158 is provided with a cross pin 164 which may detachably engage the driving dogs of a 35 mm. film spool designed to fit the film cartridge 42. An annular groove 166 is disposed adjacent the cross pin in which the bifurcated end of a lever 168 (as shown in FIG. 9) engages, the level 168 being moveable by cam 170, forming one leg of a pivoted bell crank 172, its other leg being connected to the pivoted lens system by a link 174. When the lens mount 40 is moved to the dotted line position (FIG. 8) link 174 (FIG. 9) rotates cam 170, moving lever 168 to the dotted line position thereby disengaging shaft 158 from its driving connection with the film take-up spool.

Figure 11:
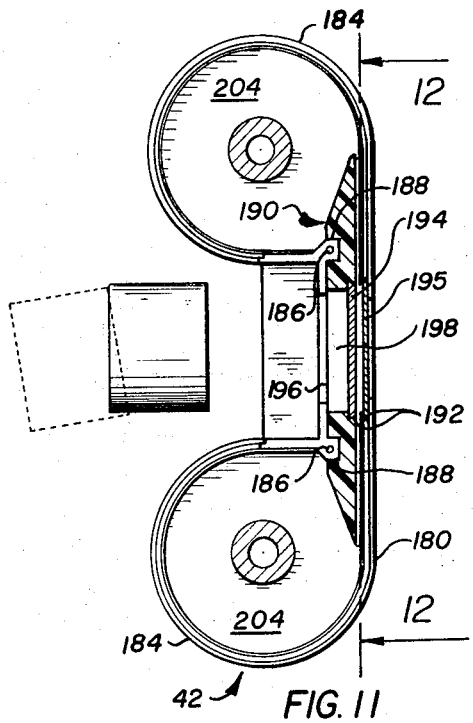
FIG. 11 is a section taken on line 11—11, FIG. 10, the film strip being omitted.
Figure 12:
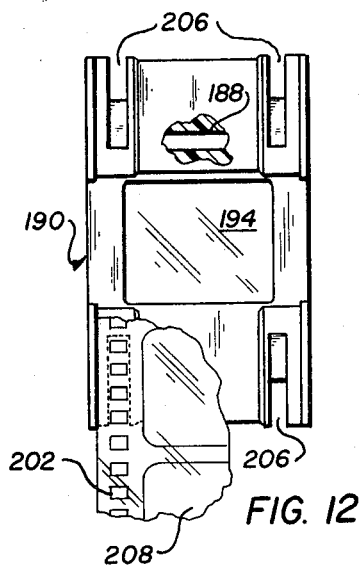
FIG. 12 is a front elevation taken on line 12—12, FIG. 11, a portion being broken away, and the film strip included.
Figure 13:
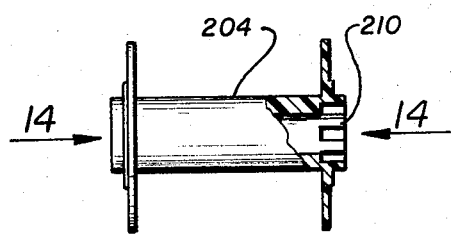
FIG. 13 is a side elevation of one of the two spools contained within the film cartridge, a portion being broken away.
Figure 14:
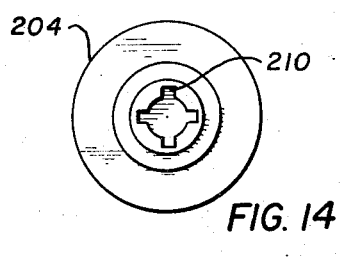
FIG. 14 is an elevation of one end of the spool shown in FIG. 13, as viewed in the direction of arrows 14.
Figure 15:
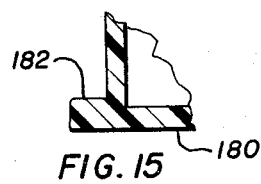
FIG. 15 is a section taken on line 15—15, FIG. 10.

The film cartridge 42 (FIGS. 10-13) which forms an important part of the invention, comprises a housing formed of a pair of identical half members 176, each of which may be formed in a single mold and joined at a central plane 178 by suitable orientation of the two identical halves. As best shown in FIG. 11 the front wall 180 of the assembly is flat and opposite lateral edges are provided with ribs 182 (FIG. 15) which are slideably received in previously described channels 130 in the carrier 36. The upper and lower or end walls 184 are circular and terminate at the rear end in a pair of parallel transverse ribs 186 which slideably register with a pair of parallel grooves 188 in a film guide plate 190. The guide plate 190 and front wall 180 of the cartridge are provided with dovetailed surfaces 192 which receive rectangular glass plates 194, 195 having like shaped edges which thus locks the plates to the housing and guide plate, respectively, when the parts are assembled. The rear of the cartridge 42 is suitably apertured to provide a gate 196 adjacent aperture 198 in the film guide plate 190, and the frontwall 180 is apertured with four slots 200 through which the sprocket teeth 120 may extend and engage the perforations 202 along the opposite edges of the film which is carried by spools 204, one spool being disposed in each end of the cartridge 42. The guide plate 190, previously referred to, is provided with four slots 206, as best shown in FIG. 12, which are aligned with the respective slots 200 in the cartridge 42. Film 208 passes across the front surface of guide plate 190 and is supported against movement perpendicular to its plane along each side of the rows of perforations. The sprocket teeth 120 extend through the lower two slots 200, through the film 208, and terminate within slots 206, thus providing a toothed drive to the perforations but supporting the film adjacent each edge of the perforation row against undesired distortion as the film is being advanced by the gear teeth. In the loading of the cartridge 42, the two halves 176 are separated and the roll of film 208 is inserted in the top circular compartment of one of the halves 176, its free end being threaded between the guide and front wall 180 onto an empty take-up spool 204 to which it may be attached by tape or a conventional slot (not shown). The other half 176 is then applied, forming a closed housing. Lens mount 40 is then pivoted forward to the dotted position of FIG. 9 which allows the cartridge 42 to be slid downward along guides 130 to its desired position wherein the sprocket teeth 120 are in geared registry with the film perforations 202. The lens mount 40 is then released for return to its full line position which also engages cross pin 164 on shaft 158 with the driving dogs 210 in one end of the lower or take-up spool. The film 208 may then be advanced to the first frame and suitably adjusted for proper registry with the gate after which the film may be advanced one frame at a time by the power means previously described.

As will now be apparent, film 208 is unrolled from the top supply spool by sprockets which advance the film the same linear distance each time. Also, the lower take-up spool rotates the same angular distance each time the film is advanced one frame since it is power driven by gears 98, 148. The diameter of the film on the lower take-up spool increases, however, which increases the amount of take-up for a fixed angular rotation of the take-up spool as it enlarges. To compensates for the difference between constant linear advance of the film and increase in take-up, the amount of rotation of the take-up spool is so designed that at the beginning of take-up the take-up spool rotates a lesser angle than required to fully take-up the film fed by the sprockets, resulting in the formation of loose loops around the take-up spool. At some point in the take up, the diameter of the film will become such that the take-up rate equals the feed rate. Beyond this diameter the take-up rate will exceed the feed rate but the film is still loosely wound about the take-up spool and hence may be compacted to a smaller diameter and thus obtain it within the annular space surrounding same.

Because the film cartridge is symmetrically formed, rewinding of the film within the film cartridge is quickly and easily done simply by removing the cartridge, reinstalling it with the "empty" spool being disposed below the "full" spool and actuating the drive mechanism until the film has been rewound as desired or required.

Due to the extreme compactness of the component parts of an audio-visual unit constructed in accordance with this invention, a considerable amount of space exists in which to store extra film cartridges and tapes for the audio unit 22. This space is that disposed beneath the second mirror 146 and adjacent thereto, such space being identified with numbers 212 and 212A in FIG. 3.

In view of all of the foregoing, it will now be readily obvious that a vastly improved audio-visual display device has been described which greatly facilitates the presentation of both audio and visual material but with a minimum of set up time involved and without annoying distractions such as occurs in selecting and threading a film through the film drive portion of the apparatus. For example, through the use of an audio-visual display device constructed in accordance with the subject invention, the time consuming problems and annoyance associated with film handling have been substantially eliminated since the film is completely stored within a cartridge which can be either installed for use or removed within a very few seconds and quickly and easily rewound. Additionally, through the use of the film cartridge as disclosed herein, problems associated with film damage or the film becoming unsuitable for use due to dirt, grime or the like becoming deposited thereon have also been eliminated. The overall cost of manufacture of an auido-visual display device constructed in accordance with the subject invention has been reduced through the use of a novel film cartridge and a novel sprocket both of which are constructed from identical halves. The reduction in cost of manufacture of the film cartridge and sprocket from their respective identical halves results in part from the use of dies and molds which are simpler in design and less expensive to manufacture than would otherwise be the case. The film cartridge and film drive mechanism disclosed herein is unique in that the film is driven at a constant rate past the aperture of the cartridge and the take-up spool within the cartridge is driven at a constant angular rate but the peripheral speed of the film being wound upon the take-up spool within said cartridge varies from film drive speed, the amount of variance depending upon the amount of film wound about the take-up spool. Thus, although a single drive mechanism is used to operate both the rate of film travel past the aperture of the film cartridge and the take-up spool in the cartridge, no damage occurs to the film strip within the cartridge even though the rate of film travel past the aperture of the cartridge is different from the rate of film travel being wound upon the take-up spool.

It is to be understood that this invention is not limited to the exact embodiments of the audio-visual device and component parts thereof shown, which are merely by way of illustration and not limitation, as various other forms and modifications will be apparent to those skilled in the art. It is therefore intended that the appended claims cover all such changes and modifications.

I claim:

1. In apparatus of the type having a projection screen, a projecting lens, a light source, an audio tape, and a film strip with edge perforations, intermittently moveable in increments of one frame upon command, to a position between the light source and lens to thereby project a still picture of a frame onto the screen for a desired time, the improvements, in combination, comprising:
   (a) a cartridge containing said film strip,
   (b) said cartridge comprising a housing having a cylindrical cavity at each end, the axes of the cavities being parallel and the outer shape of the housing, in a plane containing said axes, being substantially rectangular, the front wall of the housing being substantially flat and having sprocket tooth receiving apertures through which sprocket teeth may extend for engagement with the film edge perforations,
   (c) a film guide within the housing adjacent said front wall having an aperture therethrough over which a film frame is adapted to be stopped for projection of same,
   (d) one of the cavities of said cartridge containing a rotatable flanged idler film spool for receiving a supply of film coiled therearound,
   (e) the other cavity containing a like take-up spool for receiving film delivered from the supply spool and across the guide,
   (f) a cartridge carrier for removably receiving the cartridge, said carrier being disposed intermediate said projecting lens and said light source and spaced apart from said projecting lens,
   (g) a rotatable sprocket having teeth extending through said sprocket tooth receiving apertures of said cartridge engaging the edge perforations of the film, the diameter of said sprocket being greater than the diameter of said take-up spool,
   (h) a first power drive for intermittently rotating the sprocket upon audio tape command and for an angular distance sufficient to advance the film one frame,
   (i) a second power drive for rotating said take-up spool to thereby wind the film therearound, as fed by the sprocket,
   (j) said power drives being synchronously interconnected by a direct drive means whereby said second power drive is driven by said first power drive without slippage therebetween, and the relationship of the diameters and the angular speeds of rotation of the take-up spool and the sprocket being such that, during advancement of at least the first half of the film strip by said sprocket into the cavity containing said take-up spool, the rate at which the film strip is wound about said take-up spool is less than the rate at which the film strip is advanced into the cavity containing said take-up spool, the excess portion of the film that is advanced into the cavity containing said take-up spool being loosely wound about said take-up spool, said relationship thereby preventing tension from being transmitted to the film strip between the sprocket and take-up spool during the entire transfer of the film from the spool supply to the take-up spool.

2. Apparatus in accordance with claim 1 wherein said cartridge carrier is moveably supported to permit engagement and disengagement of the sprocket teeth and film perforations during insertion and removal of same into and out of the carrier.

3. Apparatus in accordance with claim 1 in which said second power drive includes a shaft mounted for movement axially of the longitudinal axis thereof, said shaft being detachably engageable with said take-up spool for driving same and for locking said cartridge in a predetermined position in the carrier.

4. Apparatus in accordance with claim 3 wherein said lens is normally disposed within the cross sectional space of the cartridge, preventing insertion and removal of same from the carrier, the lens being moveable out of said space to permit insertion and removal of the cartridge, and means interconnecting said lens and said shaft for moving the latter out of driving connection with the take-up spool when the lens is moved out of said space, thereby unlocking the cartridge from the carrier and permitting insertion or removal of same.

5. Apparatus in accordance with claim 1 wherein said first power drive includes a first gear rotatable therewith and said second power drive includes a second gear driven by the first gear, said second gear being connected to said take-up spool and rotatable in a direction opposite to that of the sprocket.

References Cited

UNITED STATES PATENTS

| 2,231,743 | 2/1941 | Young | 353—68 |
| 2,381,033 | 8/1945 | Bolsey | 352—78 |
| 3,455,629 | 7/1969 | Weggeland | 352—72 |
| 2,514,402 | 5/1950 | Lyon | 242—202 |
| 3,063,651 | 11/1962 | Becker | 242—205 |

FOREIGN PATENTS

| 1,110,927 | 2/1956 | France | 353—95 |
| 67,523 | 3/1958 | France | 353—15 |

LEONARD FORMAN, Primary Examiner

A. J. MIRABITO, Assistant Examiner

U.S. Cl. X.R.

353—101, 78, 119